(12) United States Patent
Baumgart

(10) Patent No.: US 6,882,550 B1
(45) Date of Patent: Apr. 19, 2005

(54) HARMONIC NEUTRALIZED FREQUENCY CHANGER

(75) Inventor: Gary E. Baumgart, Pittsburgh, PA (US)

(73) Assignee: Curtiss-Wright Electro-Mechanical Corporation, Cheswick, PA (US)

(*) Notice: Subject to any disclaimer, the term of this patent is extended or adjusted under 35 U.S.C. 154(b) by 11 days.

(21) Appl. No.: 10/694,650

(22) Filed: Oct. 27, 2003

(51) Int. Cl.[7] .................. H02M 1/12; H02M 5/20; G05F 1/70
(52) U.S. Cl. .................. 363/40; 363/71; 363/159; 323/207
(58) Field of Search .................. 363/39, 40, 65, 363/71, 157, 159, 160, 163; 323/207

(56) References Cited

U.S. PATENT DOCUMENTS

| | | | |
|---|---|---|---|
| 3,825,815 A | | 7/1974 | Gyugyi et al. |
| 4,651,265 A | | 3/1987 | Stacey et al. |
| 4,812,669 A | | 3/1989 | Takeda et al. |
| 5,005,115 A | | 4/1991 | Schauder |
| 5,047,909 A | | 9/1991 | Hosoda |
| 5,198,746 A | | 3/1993 | Gyugyi et al. |
| 5,465,203 A | * | 11/1995 | Bhattacharya et al. ........ 363/40 |
| 5,499,178 A | * | 3/1996 | Mohan ........................ 363/39 |
| 5,936,855 A | * | 8/1999 | Salmon ........................ 363/46 |
| 6,297,980 B1 | * | 10/2001 | Smedley et al. .............. 363/89 |
| 6,326,796 B1 | * | 12/2001 | Koda et al. .................. 324/707 |

* cited by examiner

*Primary Examiner*—Adolf Berhane
(74) *Attorney, Agent, or Firm*—Reed Smith LLP

(57) ABSTRACT

A power converter that produces variable frequency multiphase AC power from fixed or variable frequency AC power. The converter can be used to drive an AC motor for propulsion applications or other motors and loads that require variable frequency AC power. The power converter system is based on a combination of several power conversion technologies used in a power circuit topology and a regulator control system that allows for higher electrical efficiency, higher power density and lower power distortion to be achieved than is possible from any of the individual technologies. Specifically, the input and output power distortion of a frequency changer is monitored, and a group of high performance inverters are used to inject harmonic currents into a specially designed transformer to neutralize the power distortion to a specified acceptable level. By this neutralization, the power density of a solid-state electric power converter is increased (e.g., by a factor of 5–6) and power quality distortion is reduced (e.g., below 0.1%). These features are especially useful in the electric power conversion markets particularly for surface ship and submarine propulsion drive applications.

20 Claims, 9 Drawing Sheets n = INVERTER LEVEL NUMBER

HARMONIC NEUTRALIZED FREQUENCY CHANGER

BACKGROUND OF THE INVENTION

1. Field of the Invention

The present invention relates generally to frequency changer circuits for electric motor systems, and more specifically, the present invention relates to the calculation, generation, application and control of currents to neutralize unwanted harmonic frequencies in conventional frequency changer circuits.

2. Description of the Background

In many diverse environments, electric motors are used as drive or propulsion systems. The requirement for low noise and low distortion power conversion systems has made the multilevel PWM (pulse width modulation) technology a strong contender for many different electric motor drive applications. However, the efficiency and power density of this technology is limited by the need for two to three stages of power conversion. Specifically, power must first be converted from AC to DC and then from DC back to AC by accommodating the PWM technology.

These multistage conversions hinder system efficiency and lower power density. For example, the losses in the conversion processes typically range from 2–3% of applied power. Moreover, the power density for the PWM multilevel inverter has traditionally hovered in the range of from 0.5 to just over 1.0 MW/m$^3$. In fact, when all of the equipment required for the total conversion process, (e.g., transformers, rectifiers, inverters and filters) are included in the power density calculation, the system power density is typically in the range of 0.5–0.75 MW/m$^3$.

In many applications, these losses are not acceptable. For example, any wasted power in "onboard" or self-sustained systems such as ships and submarines significantly decreases propulsion system performance. Where power is at a minimum, the present invention finds its most effective applications.

In addition to these specific propulsion applications, improvements in the power density via a reduction in losses is continually sought in all electric motor arts. As such, the present invention preferably provides a system architecture capable of improving the power density of electric motors over traditional PWM systems by a factor of at least 3–6 times and reducing system losses to about 1%.

SUMMARY OF THE INVENTION

In accordance with at least one preferred embodiment, the present invention provides a frequency changer circuit that compensates and corrects for unwanted harmonic frequencies that are characteristic of convention frequency changers. Specifically, the present invention includes the calculation and application of signals that cancel the unwanted harmonic frequencies that traditionally exist at both the input and output ends of a conventional frequency changer.

Specifically, the present invention includes a conventional frequency changer adapted to change AC power at an input frequency to output power at a different frequency (single phase or multiphase). Because unwanted harmonic frequencies appear at both the input and output of this frequency changer, the present invention injects signals via injection transformers at the input and output of the frequency changer in order to cancel these unwanted harmonics.

A multilevel DC link controller and DC link are connected to an input and output high bandwidth PWM inverter to produce the compensating signals. The outputs of the inverters are filtered and then applied to the input and output of the frequency changer with specially-designed transform and controller circuits. These components may all optionally be built right into the existing motor circuitry.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

In at least one preferred embodiment, the present invention comprise a novel system architecture that will reduce system losses in electric motors to less than 1% and increase the power density by a factor of 3 to 6 times better than basic multilevel PWM power converters. The architecture is described as a "harmonic neutralized frequency changer." FIG. 1 depicts a general block diagram of the system architecture according to the present invention, and each part of the system will be described in turn below.

Figure 1:
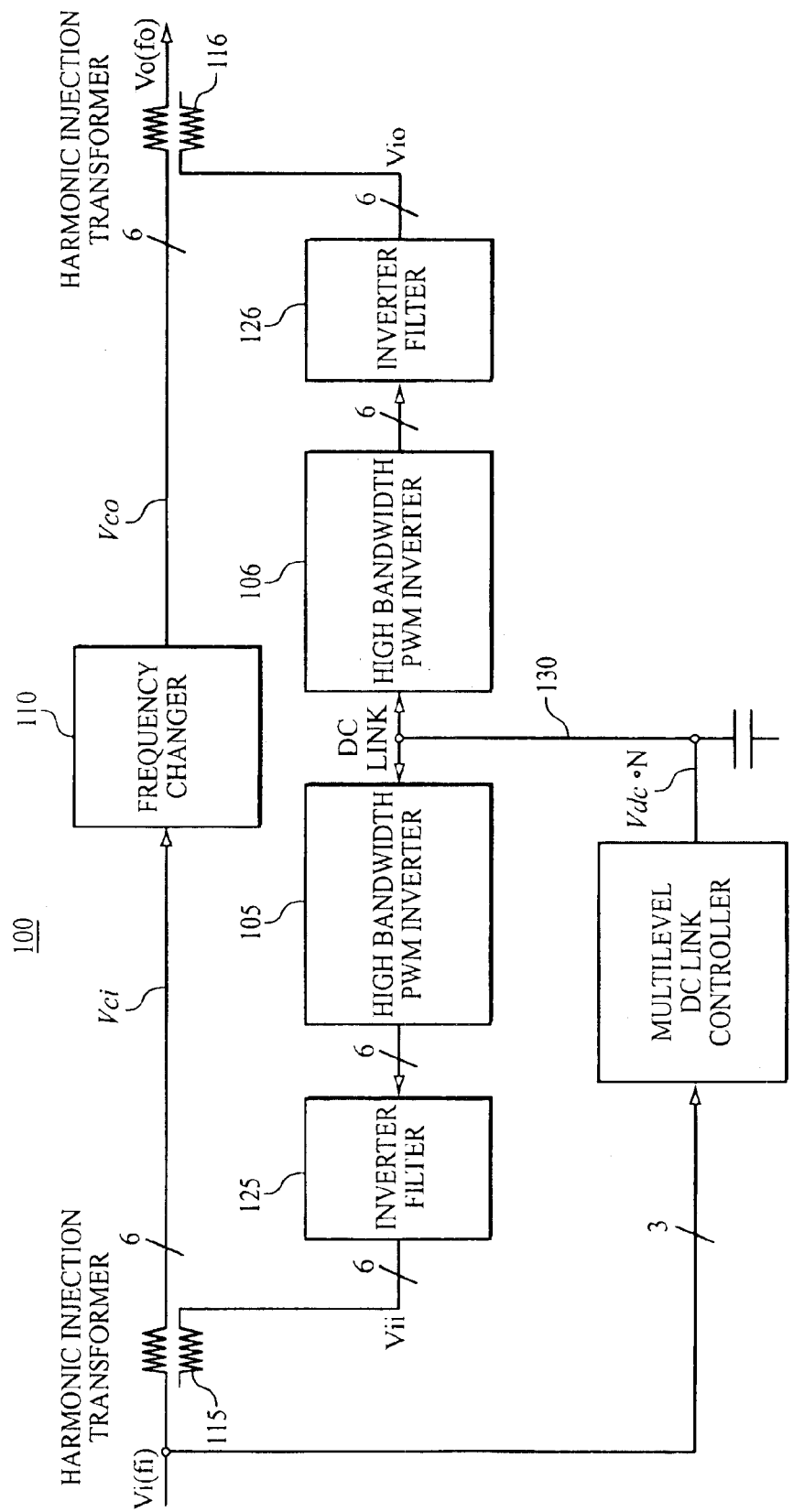
FIG. 1 shows a system block diagram for the advanced harmonic neutralized frequency changer of the present invention.

The power converter design (100) of FIG. 1 is based on a unique topology that employs a direct conversion frequency changer to convert the source AC power to variable frequency output power. In a practical application, the source AC power can be a generator and the output power can be applied to a motor load, but this is only an exemplary component selection for purposes of describing the present invention.

These types of power converters are very efficient and have high power densities compared to DC link power converters. However, direct power converters generate a rich spectrum of unwanted harmonics in the input and output current. These generated harmonics are a function of the generator frequency and the variable output frequency. The power converter topology 100 of the present invention shown in FIG. 1 neutralizes the dominant harmonic currents in both the input and output by injecting neutralizing harmonic currents generated by high bandwidth inverters 105, 106 while only demanding modest power capability. By use of the present invention, the total harmonic current distortion is preferably less than 0.1% of rated current, and the worst-case single harmonic current is preferably less than 0.05% of the rated current.

As seen in FIG. 1, the traditional path from an input voltage (Vi) to the output voltage (Vo) is accomplished through a conventional frequency changer 110. The present invention, however, adds harmonic injection transformers at both the input 115 and output 116 of the frequency changer. These harmonic injection transformers 115, 116 are used to inject signals that neutralize the unwanted harmonics that exist at the input and output of the frequency changer 110. The neutralizing harmonics are generated by high bandwidth PWM inverters 105, 106 controlled by a multilevel DC link controller 130 as described below.

In order to facilitate a better understanding of the present invention, each of the major components of the harmonic neutralized frequency changer system 100 will now be presented. Although many component alternatives are presented, each of these components are provided by way of example only, and one skilled in the art can easily envision additional alternatives within the scope of the present disclosure.

Frequency Changer

Most electronic power converters can be characterized as some sort of frequency changers. For example, a simple rectifier circuit converts multiphase input AC power to one-phase output power with a frequency of zero. Similarly, a simple inverter converts one-phase input power with a frequency of zero to multiphase AC output power with a specified frequency. Extending these concepts, the general frequency changer 110 converts AC input power with a specified non-zero frequency to AC output power with a specified non-zero frequency.

Figure 2:
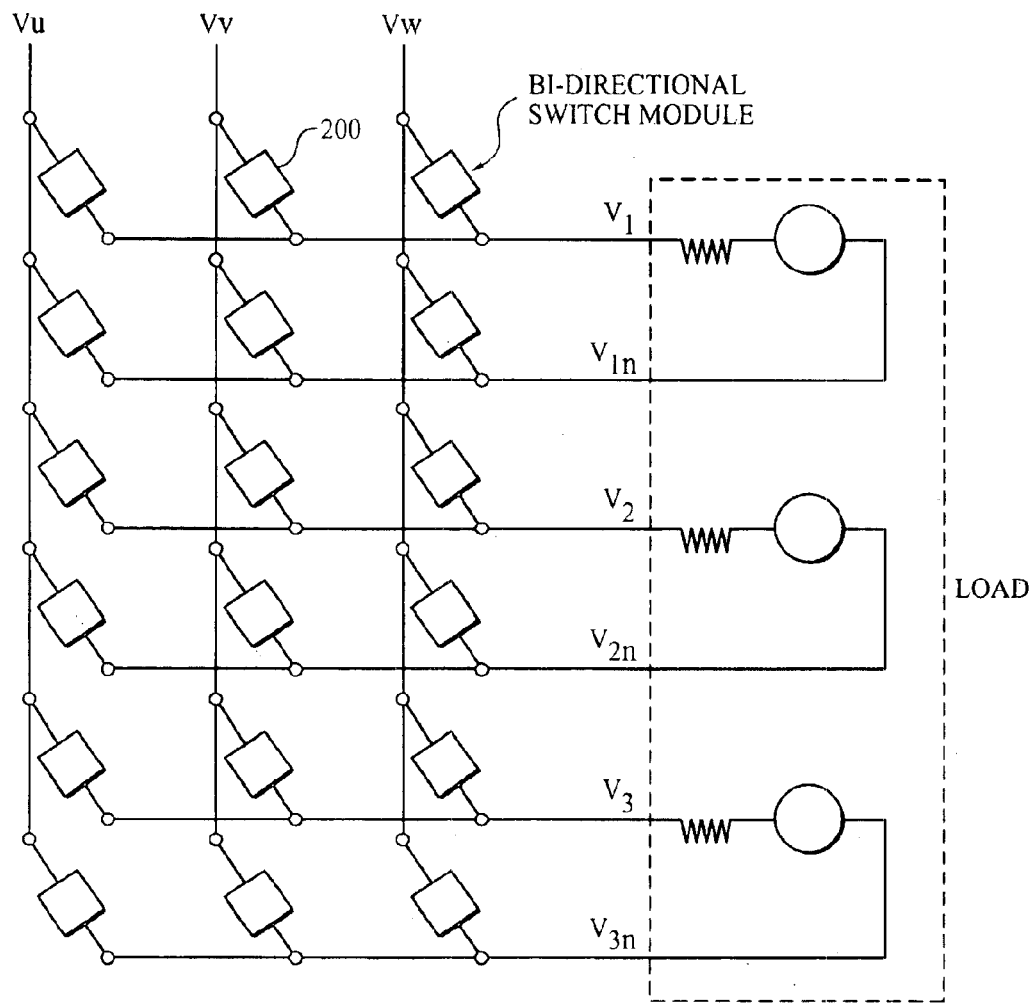
FIG. 2 depicts a general three-phase to three-phase frequency changer.
Figure 3:
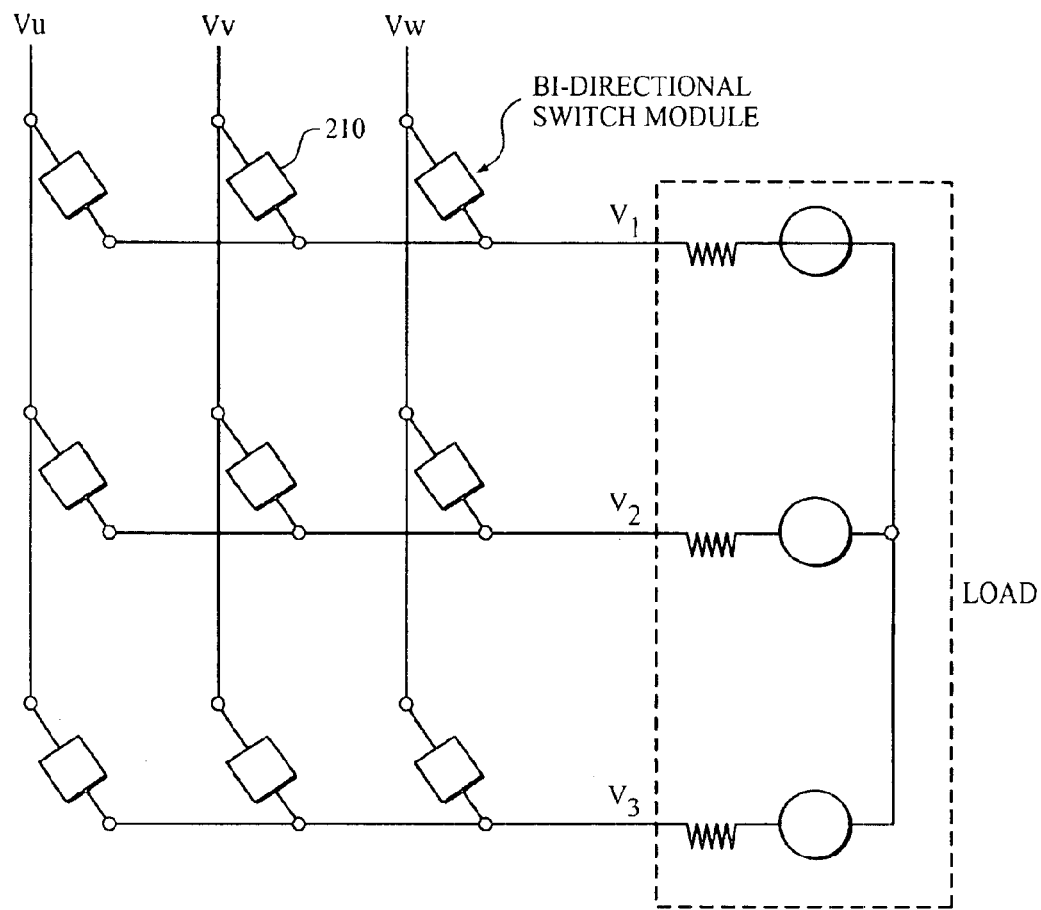
FIG. 3 depicts a three-phase to three-phase matrix converter.

There are two basic circuit topologies for a three-phase AC to three-phase AC frequency change. The general three-phase to three-phase frequency changer, shown in FIG. 2, uses a combination of bi-directional switch modules 200 in order to accomplish the frequency change. Likewise, the three-phase to three-phase matrix converter, shown in FIG. 3, uses a simplified combination of bi-directional switch modules 210 to accomplish the frequency change.

There are a variety of direct power converter technologies that utilize these general circuit topologies that can be functionally applied in this invention. Some of these circuit topologies, all of which utilize bi-directional switches and are common in the art, include: (1) the Naturally Commutated Cycloconverter (NCC); (2) the Unrestricted Frequency Changer (UFC); (3) the Unity Displacement Factor Frequency Changer (UDFFC); (4) the Controllable Displacement Factor Frequency Changer (CDFFC); and (5) the Matrix Converter (MC).

In each of these technologies, the output frequency and voltage can be controlled continuously and adjusted independently of each other. Further, the output power equals the input power allowing for minor internal losses. Any of these frequency changer topologies can be applied in this invention. However, the NCC, UFC and MC are, for a number of reasons, most appropriate for motor drive applications. The NCC can be effectively applied when the output frequency is less than the input frequency. The UFC and MC are good choices when the output frequency approaches or exceeds the input frequency.

Figure 4A:
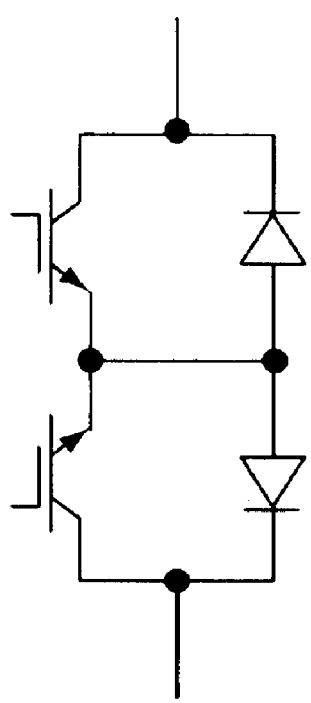
FIG. 4 details three exemplary configurations (4A–4C) of bi-directional switches.
Figure 4B:
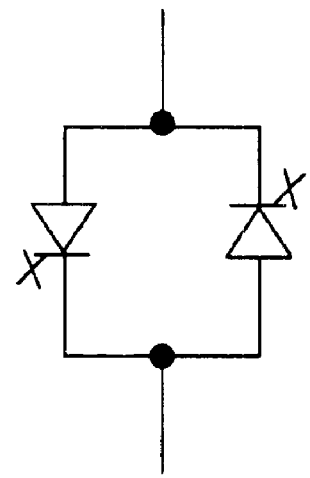
Figure 4C:
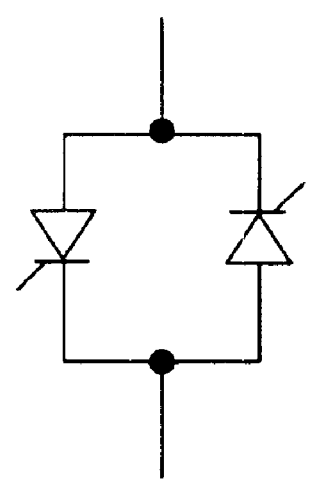

The controlled bi-directional switch 200, 210 used in these topologies must be able to carry current in both the forward and reverse direction, and the switch must be able to be turned on at specific phase angles with respect to the input voltage source. Partially controlled switches are adapted to be turned on at any angle but are naturally commutated off by source voltage. Fully controlled switches, on the other hand, are adapted to be turned on or off at any angle. There are a variety of implementations for bi-directional switches. Some of the most practical implementations of bi-directional switches are shown in FIG. 4. Specifically, FIG. 4A shows a fully controlled IGBT bi-directional switch module, FIG. 4B shows a fully controllable GTO bi-directional switch module, and FIG. 4C shows a partially controlled thyristor bi-directional switch module.

Some key exemplary characteristics and control limitations of each of these power converter technologies are given in Table I (below).

TABLE I

Characteristics of Direct AC Power Converters

| Power Converter Type | Output Frequency Range | Output Voltage Range | Source Power Factor | Modulation Function | Type of Power Switch | Number of Switches for Three Phase System |
|---|---|---|---|---|---|---|
| NCC | $0 \leq f_o \leq f_i$ | $0 \leq V_o \leq V_{max}$ | $\theta_i = |f(V_o, \theta_o)|$ | Periodic | Bi-directional Partially Controlled | 18 |
| UFC | $0 \leq f_o \leq \infty$ | $0 \leq V_o \leq V_{max}$ | $\theta_i = \pm\theta_o$ | Linear (PWM) | Bi-directional Fully Controlled | 18 |
| UDFFC | $0 \leq f_o \leq f_i$ | $0 \leq V_o \leq V_{max}$ | $\theta_i = 0$ | Periodic | Bi-directional Fully Controlled | 18 |
| CDFFC | $0 \leq f_o \leq f_i$ | $0 \leq V_o \leq V_{max}$ | $-\theta_{max} \leq \theta_i \leq \theta_{max}$ $\theta_{max} = f(V_o, \theta_o)$ | Periodic | Bi-directional Fully Controlled | 18 |
| MC | $0 \leq f_o \leq \infty$ | $0 \leq V_o \leq V_{max}/2$ | $\theta_i = \pm\theta_o$ | Linear (PWM) | Bi-directional Fully Controlled | 9 | where Vmax=(3√3/n)Vi          equation (1)

All frequency changers consist of an array switches that allow a multiplicity of input AC voltages to be switched to a multiplicity of output phases to construct a controlled AC output voltage where output voltage and output frequency can be controlled. In some cases the source power factor can also be controlled. The main difference between the various types of frequency changers is in the method of synthesizing the output waveform.

The unique characteristics of the various types of frequency changers are determined by the sequence of switching and a modulation function applied to the array of switches. Two modulation functions are typically used in frequency changers to generate sinusoidal output voltage. These two functions are the linear (triangular) function given by: $M(t)=\arcsin(\sin(\omega_o t+\psi))$, and the periodic function given by: $M(t)=\arcsin(r*\sin(\psi_o t+\psi))$, where r is the ratio of the output voltage amplitude to the input voltage amplitude.

At the center of the problem addressed by the present invention, a by-product of the output voltage waveform synthesis is a broad spectrum of unwanted frequencies. These unwanted harmonic components will appear as currents in both the input and output of the frequency changer. The frequency spectrum is complex and varies for each type of frequency changer. In addition, the, magnitude and frequency of the unwanted harmonics change with the output load, voltage and frequency. Therefore, simple filtering techniques are not effective in attenuating these unwanted frequencies.

In general, the output voltage for the frequency changer (of whatever type) will include a fundamental voltage component plus: (1) harmonics of the output frequency; (2) third order harmonic components of the input frequency; and (3) sideband harmonics. The output voltage for a three-phase output frequency changer operating into a balanced symmetrical load can thus be generalized by the following expression:

$$V_o = \frac{3\sqrt{3}}{\pi} \cdot V_i \cdot [$$
$$\sin(\omega_o \cdot t + \psi_o) + \sum_{m=2}^{\infty} a_m \cdot \sin(m \cdot \omega_o \cdot t + m \cdot \psi_o) + \sum_{n=1}^{\infty} b_n \cdot \sin(3 \cdot n \cdot \omega_i \cdot t) +$$
$$\sum_{n=1}^{\infty} \sum_{m=1}^{\infty} \{c_{mn} \cdot \sin(3 \cdot n \cdot \omega_i \cdot t \pm 2 \cdot m \cdot \omega_o \cdot t \pm 2 \cdot m \cdot \psi_o) +$$
$$d_{mn} \cdot \sin(3 \cdot n \cdot \omega_i \cdot t \pm m \cdot \omega_o \cdot t \pm m \cdot \psi_o)\}]$$

where $\psi$ is the phase voltage displacement angle with respect to the input voltage reference In addition to the output harmonics, the input current for the frequency changer will also contain a spectrum of unwanted frequencies. The input current will contain the fundamental current component for each of the output phases and the sideband harmonic frequencies for each of the output phases. We can generalize the input current for a three phase output frequency changer with a balanced symmetrical load by the following expression:

$$I_1 = \frac{1}{3} \cdot I_o \cdot \left[\sin\left(\omega_o \cdot t + \theta_o - \frac{2\pi}{3}\right) + \sin\left(\omega_o \cdot t + \theta_o - \frac{4\pi}{3}\right)\right] +$$

-continued $$\frac{1}{\pi} \cdot I_o \cdot \left[\sum_{m=1}^{\infty} a_m \cdot \{\sin(m \cdot \omega_i \cdot t + (m+1) \cdot \omega_o \cdot t + \theta_o) - \sin(m \cdot \omega_i \cdot t + (m-1) \cdot \omega_o \cdot t + \theta_o)\}\right] +$$

$$\frac{1}{\pi} \cdot I_o \cdot \left[\sum_{m=1}^{\infty} a_m \cdot \left\{\sin\left(m \cdot \omega_i \cdot t + (m+1) \cdot \omega_o \cdot t + \theta_o - (m+1) \cdot \frac{2\pi}{3}\right) - \sin\left(m \cdot \omega_i \cdot t + (m-1) \cdot \omega_o \cdot t + \theta_o - (m-1) \cdot \frac{2\pi}{3}\right)\right\}\right] +$$

$$\frac{1}{\pi} \cdot I_o \cdot \left[\sum_{m=1}^{\infty} a_m \cdot \left\{\sin\left(m \cdot \omega_i \cdot t + (m+1) \cdot \omega_o \cdot t + \theta_o - (m+1) \cdot \frac{4\pi}{3}\right) - \sin\left(m \cdot \omega_i \cdot t + (m-1) \cdot \omega_o \cdot t + \theta_o - (m-1) \cdot \frac{4\pi}{3}\right)\right\}\right]$$

In high performance power converter applications where good input and output power quality is a requirement, the unwanted harmonics must be removed or neutralized. The generation of these neutralizing signals is the function of the input and output high bandwidth inverters 105, 106 shown in FIG. 1.

High Bandwidth PWM Inverter

There are a variety of different inverter circuit topologies that may be applied to the concepts of the present invention and that are understood by those skilled in the art. For example, the multilevel cascade H-bridge and the multilevel diode-clamped inverter are two exemplary topologies. The necessary requirement for the PWM inverter circuit 105, 106 is that the inverter must have a: high bandwidth in order to neutralize currents in the range of the harmonics generated by the frequency changer 110. This will require effective switching frequencies in the range of about 40 to 50 kHz— well above the range obtainable by basic IGBT inverters.

Typical IGBTs can be switched in the range of about 5 to 10 kHz and in some case as high as 20 kHz. To obtain the required switching frequency for the present invention, IGBT switching information must be multiplexed between multiple devices. Multiplexing can be accomplished in the distributed voltage domain or in the time domain. The aforementioned multilevel inverters are used to accomplish the former. The latter time domain multiplexing is not discussed herein.

The inverter function does not generate or consume real power except for losses within the inverter itself. However, these losses may be significant because of the high switching frequency. Moreover, switching losses may contribute as much as 80% of the total inverter losses.

The rating of the inverter will be based on the reactive power required to neutralize the harmonics in the input and output current. Fortunately, this will be a small fraction of the total power rating of the system. This fact weighs heavily on the improved performance of the present invention. For example, the reactive current that must be generated by the inverter to neutralize the input harmonics of an NCC frequency changer is given by:

$$I_{iq} = \frac{3\sqrt{3}}{\pi} \cdot \frac{4}{\pi} \cdot Io \cdot \sum_{n=0}^{\infty} \frac{a_n \cdot \cos(2n \cdot \theta_o)}{4 \cdot n^2 - 1} \cos(\omega_i \cdot t)$$

where $$\sum_{n=0}^{\infty} \frac{a_n}{4 \cdot n^2 - 1}$$

converges rapidly.

Figure 5:
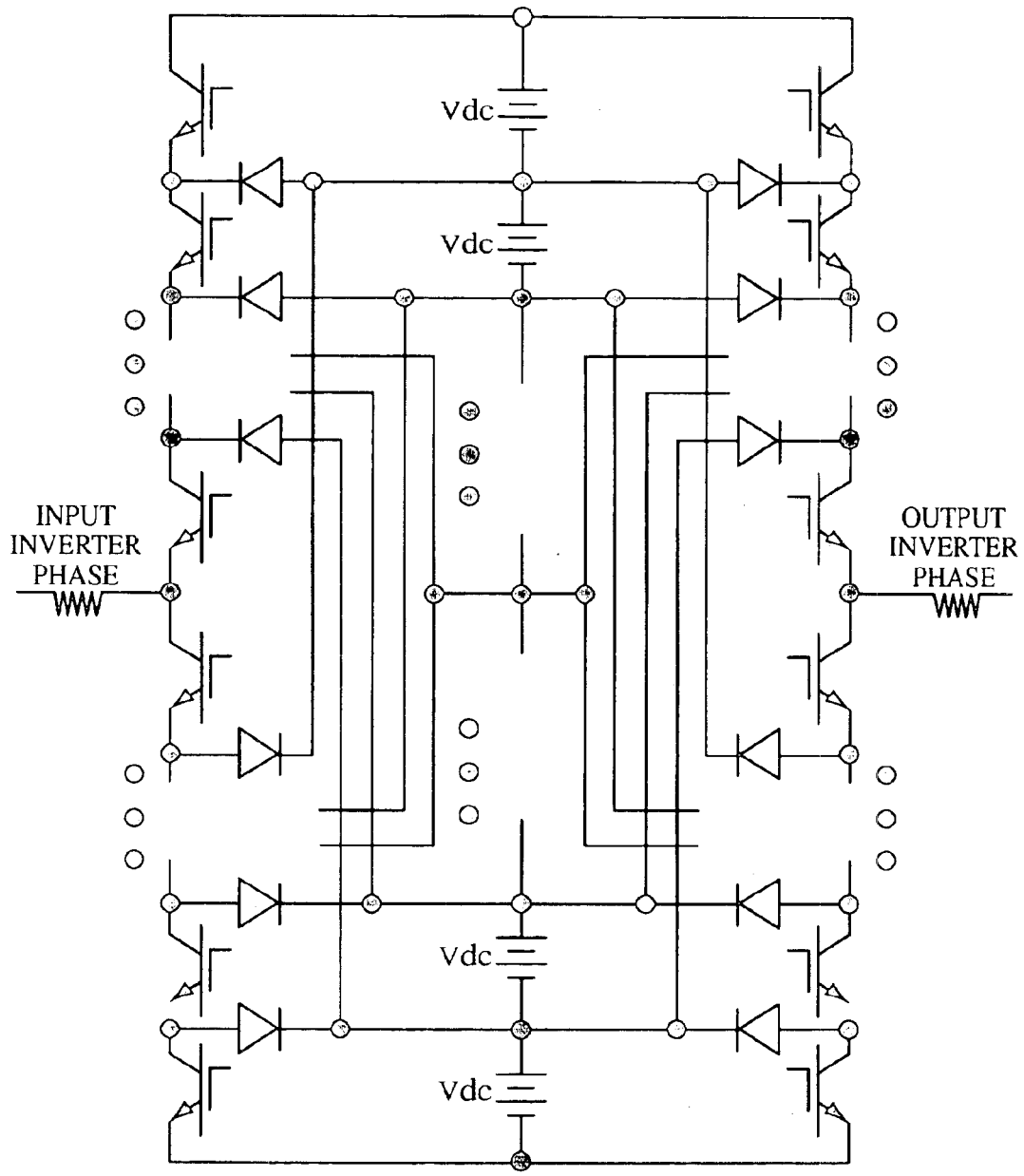
FIG. 5 details an exemplary clamped-diode inverter.

As an exemplary (but not limiting) embodiment, a multilevel clamped-diode inverter 105, 106 is shown in FIG. 5 for clarity. FIG. 5 details one inverter phase for the input inverter and the output inverter connected back-to-back. The advantage of this topology is the input and output neutralization inverters can be connected back-to-back and share a common DC link (see also FIG. 1). Therefore, fewer controlled DC link power sources are required when compared with the cascade H-bridge topology. The number of controlled supplies will equal (n−1) where n is the level number for the inverter. The level number is selected so that the basic switching frequency for the inverter IGBT module multiplied by 2(n−1) exceeds 40 kHz (i.e., $f_s*2(n-1)>40,000$).

As briefly described above, the inverter output will preferably be controlled by pulse width modulation (PWM) of the inverter power switches. This form of modulation produces sideband harmonics centered on the effective switching frequency. The inverter filters 125, 126, shown in FIG. 1, attached to the inverter output 105, 106 must be applied to attenuate these harmonics. The reactive power of the harmonic spectrum is proportional to the product of the IGBT switching frequency and the square of the total DC link voltage divided by $4(n-1)^2$. The size of the filter 125, 126 is therefore increased linearly with the switching frequency and reduced by the square of the inverter level number. For example, a five-level inverter 105, 106 will require a filter 125, 126 only 1/16 the size of the filter for a two-level inverter switching at the same effective frequency.

An ideal filter will not absorb any of the harmonic energy but will effectively circulate the harmonic currents between the filter and the power source where it is dissipated. Minimizing the energy of the switching frequency harmonics will reduce these losses and improve the efficiency of the system. The filter 125, 126 is thus designed to reduce the switching harmonics to the required distortion level (typically 0.1%). The active control bandwidth will be approximately 0.1 to 0.2 times the effective switching frequency of the inverter 105, 106. Therefore, the filter attenuation factor must be the total DC link voltage times 1/(n−1) $10^3$ per decade. This requires a 2 to 4 pole filter to achieve the attenuation, and the response should be flat up to the break point set above the active control bandwidth.

DC Link Controller

Multiple controlled DC power supplies are required to operate the inverters 105, 106; however, the exact number is dependent on the type of inverter selected for the system. The DC link controller 130 must provide power to balance the losses of the inverters 105, 106. Except for these losses, the net real power requirement for the inverters 105, 106 is zero. However, certain components in the rectifier circuit must be rated to carry current between adjacent rectifier bridges to transfer energy between adjacent levels to maintain a constant voltage at each level under changing conditions.

Figure 6:
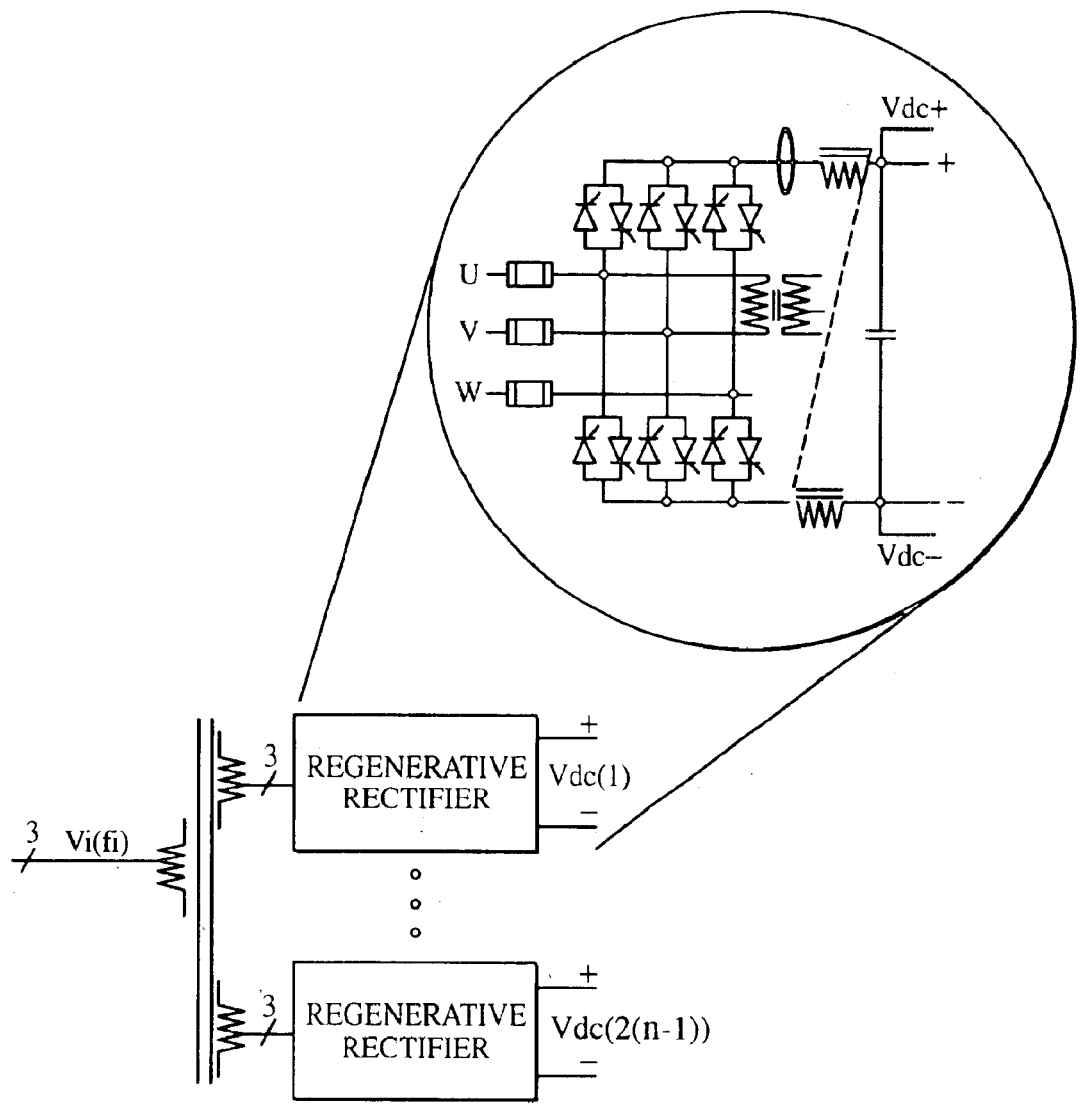
FIG. 6 shows an exemplary DC link controller.

A controlled regenerative rectifier is provided for each inverter level as specified above. Each rectifier will consist of a dual full-wave bridge and an inductor to control the DC ripple current. Each rectifier will be independently self-controlled with an inner current loop and outer voltage loop. The bandwidth of the current loop is preferably high (>1000 rad/s) to maintain good voltage regulation. FIG. 6 shows a typical implementation of the DC link controller 130, with an exploded view of the regenerative rectifier.

Power Converter Regulator Control System

The power converter regulator control system can be divided into three independent sections: (1) the Frequency Changer Controller; (2) the Input Inverter Controller; and (3) the Output Inverter Controller.

Figure 7:
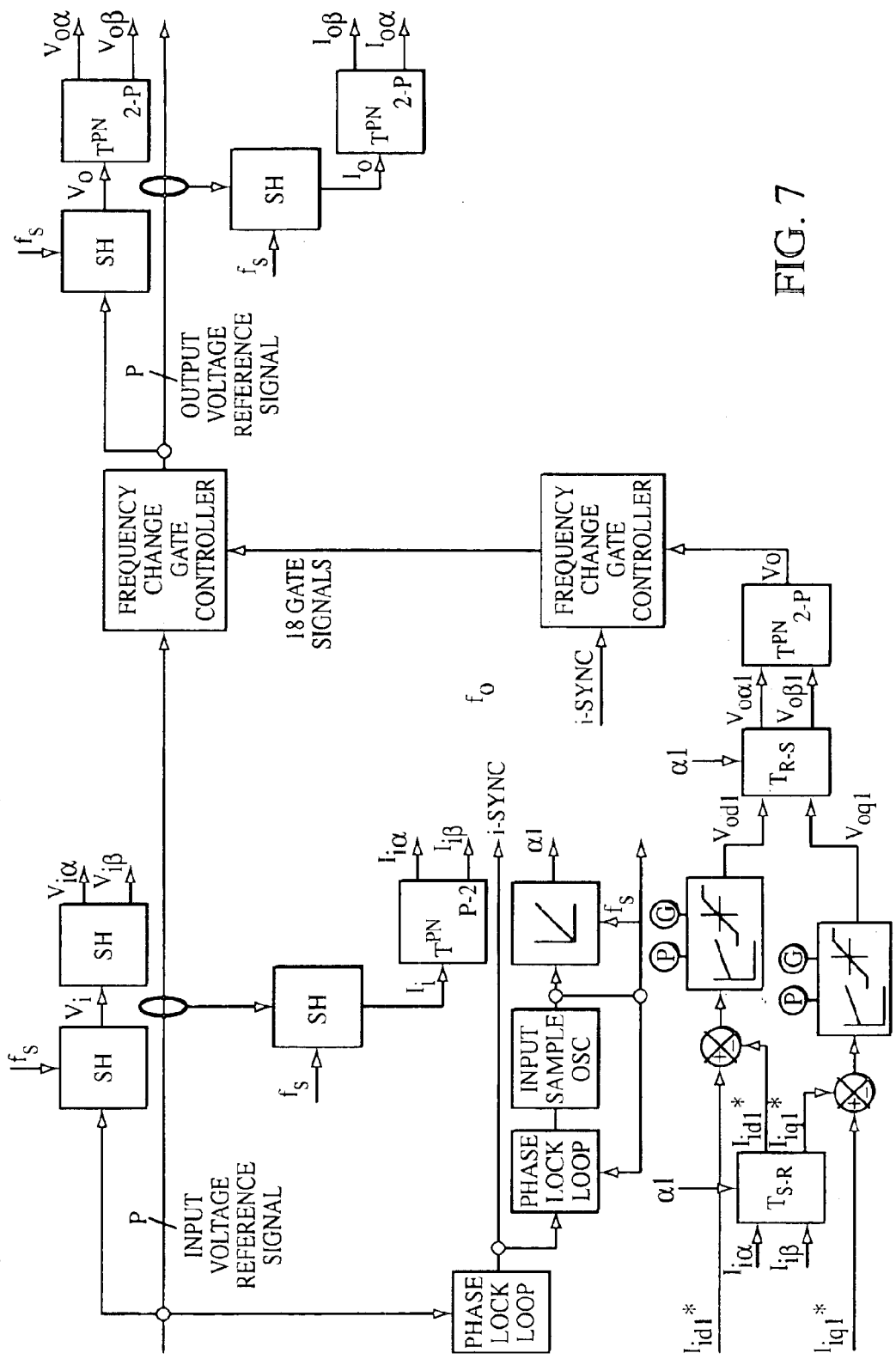
FIG. 7 shows an exemplary frequency changer controller.

The function of the frequency changer controller is to control the fundamental current and the bulk power transfer of the power converter system. FIG. 7 details an exemplary embodiment of the frequency changer controller. The controller is structured as a current controller that can be applied with outer control loops for frequency, voltage, flux, torque and speed. The outer loops feed into the independent direct and quadrature current references shown in FIG. 7. The flexibility of this controller allows it to be applied to motor drives as well as power conditioning systems.

In this exemplary embodiment, the frequency changer gate controller is slaved to the source voltage reference by a phase lock loop. Signal sampling and processing are also synchronized to the source voltage. The controller applies reference transformations to demodulate the converter fundamental current to a DC level in a rotating coordinate system synchronous with the output fundamental frequency. The control facilitates independent d-q current control of the fundamental current only. The harmonics are removed from the signal by the demodulation process and the natural roll-off in gain for the P-I current controller.

Whereas the frequency changer 110 controls the bulk power of the system, the input 105 and output 106 inverters control the injected harmonic currents to neutralize the harmonically corrupted bulk power. The inverters 105, 106 need only be sized to provide reactive power that allows the inverters to be rated at a fraction of the system rating.

Figure 8:
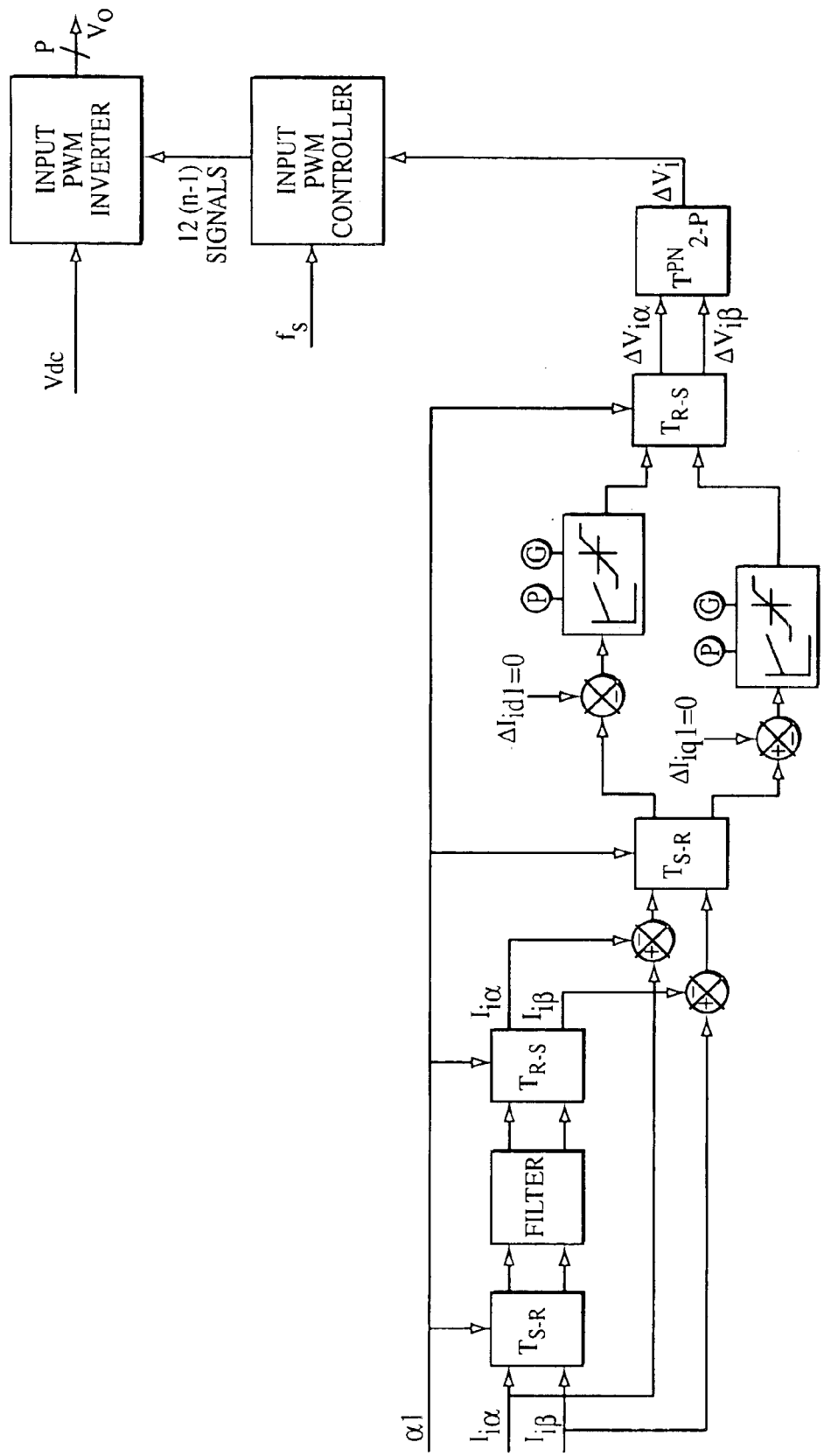
FIG. 8 shows an exemplary input inverter controller.

There are several control strategies that can be applied to the present invention. Briefly, some main control strategies can be summarized as: (1) fundamental differential harmonic neutralization by series voltage injection; (2) fundamental differential harmonic neutralization by current injection; (3) discrete harmonic neutralization by series voltage injection; and (4) discrete harmonic neutralization by current injection. Each of these control strategies can be applied to both the input and output inverter functions. For the purpose of this exemplary embodiment, the fundamental differential harmonic neutralization by series voltage injection method will be described. The controller is shown in FIG. 8 for the input inverter. Only small differences in nomenclature differentiate it from the output inverter.

The input inverter PWM controller is slaved to the source voltage reference by a phase lock loop. Signal sampling and processing are also synchronized to the source voltage. The controller applies reference transformations to demodulate the converter fundamental current to a DC level in a rotating coordinate system synchronous with the power converter output fundamental frequency. The harmonic components are removed from the d-q fundamental currents by filtering. The resulting signal is then transformed into the α-β coordinate plane. The fundamental α-β currents are subtracted from the total current α-β components. The resulting signal contains the harmonic current information. This is then transformed back into the d-q plane and regulated to zero.

This control strategy will not be effective for higher frequency harmonic components. For those cases, the discrete harmonic neutralization strategy can be used. Individual harmonics can be independently controlled. The individual harmonic frequencies are calculated based on the equations presented above. The control is only limited by the effective switching frequency of the inverter and the number of harmonics to be included. In most situations, 90% of the harmonic current THD is from the 24 most prominent harmonics.

Harmonic Injection Network

As shown at a high level in FIG. 1, the harmonic currents or voltage generated by the input 105 and output 106 inverters must be injected (at 115 and 116) into the frequency changer 110 input and output circuits to neutralize the unwanted harmonics. There are two main methods used to accomplish the injection. The first method is to inject a voltage in series with the frequency changer generated voltage, and the second method is to inject a current in parallel with the frequency changer generated current.

Figure 9A:
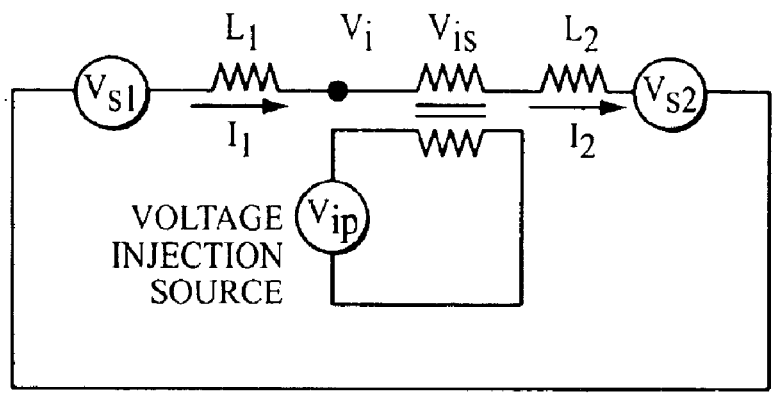
FIG. 9 depicts various harmonic injection transformers including in series with the frequency changer (FIG. 9A) and in parallel with the frequency changer (FIG. 9B).
Figure 9B:
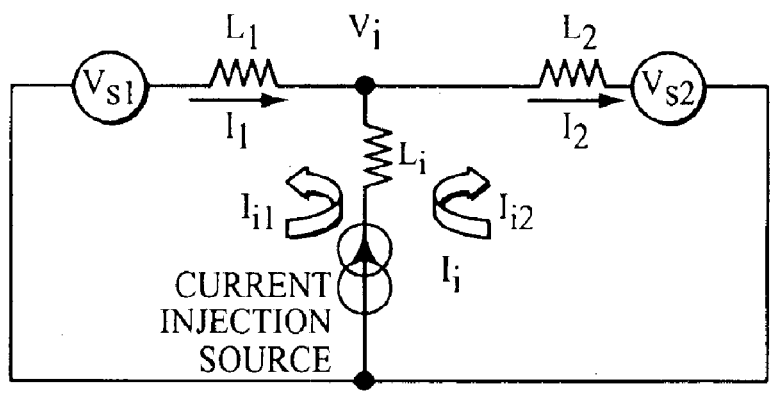

The first of these solutions is depicted in FIG. 9A and the second solution is shown in FIG. 9B. The injection network components 115, 116 can be separate transformers for power conditioner applications, or in the case of motor drives and ship propulsion applications, the injection network components can be incorporated as compensation windings in the power source generator and the motor. Existing systems have never combined the injection network components into the generator and motor.

System Performance and Applications

According to computer simulation, the total harmonic distortion of the frequency changer system may be reduced dramatically. This invention provides high power conversion efficiency by reducing the number of electric conversions to just one. Other benefits include the reduction in the volume and weight of the power converter, and a highly responsive means to control the current harmonics in the generator and propulsion motor to very low levels as compared to current systems.

Alternative Discrete Harmonic Neutralization

The above-described inverter controller methodology was based on wideband harmonic neutralization based on fundamental discrimination. An alternative method of discrete harmonic neutralization based on pre-calculated harmonic spectrum for the power converter will now be described.

The control concept applies equally to input-side and output-side inverters. However, the description provided in this disclosure will apply to the output-side inverter. The harmonic injection can be implemented as a shunt current into the output to cancel the resident harmonic currents. (Similar to the concept shown in FIG. 8).

The inverter controller is synchronized to the frequency changer reference by a phase-lock-loop. Signal sampling and processing are also synchronized to the source voltage. For this configuration, frequency changer current must be the observed control signal. Therefore, the frequency changer current is sampled in the natural multiphase stationary reference system. These signals are then applied to a series of reference transformations to demodulate the converter fundamental current to a DC level in a rotating coordinate system synchronous with the output fundamental frequency.

An appropriate transformation for converting multi-phase stationary reference signals to two-phase signals is used. The stationary reference signal two-phase signal is subsequently transformed to two-phase rotating reference signals without any loss of system state information. However, the transformation is rotated at the frequency of a specified harmonic signal. The result of this transformation is a signal equal to the specified harmonic as observed in the rotating reference.

The harmonic signals are applied to a pair of proportional plus integral controllers that independently regulate inverter the direct and quadrature current components by generating voltage references for the inverter. The voltage references are two-phase rotating reference signals that must be transformed back to the multiphase stationary reference format using the same transformations from above. The individual harmonic signals for each phase in the stationary reference are subsequently summed to generate a reference signal for each phase.

The multiphase, stationary reference signals are sent to the PWM Inverter controller that generates the appropriate level of harmonic voltage or harmonic current for injection into the load circuit. In this process the inverter in association with a reactor becomes a harmonic current source. At the point of injection the harmonic signals are inverted and cancel the resident harmonic components.

This process is applied to a specified number of the dominant harmonics produced by the frequency changer. The value of "n" for the specified harmonics can be calculated for any specified type of frequency changer for a specified operating condition. If the most dominant (e.g., six to twelve) harmonics are neutralized by this process the output distortion of the frequency changer can be reduced to any specified level by adding additional harmonic controller components.

Although described by exemplary embodiments, the present invention may be applied to virtually any power conditioning or electric motor drive application. However, the greatest advantages will be realized in applications where power density and power quality must be maximized. Propulsion and pump drives for ships and submarines are examples of applications that greatly benefit from high power density and high power quality.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A power converter system, comprising:
   a direct conversion frequency changer, implemented as an Unrestricted Frequency Changer or a Matrix Converter, including an input and an output, the frequency changer adapted to accept an input voltage at an input frequency at the input and deliver an output voltage at an output frequency at the output;
   an input high bandwidth inverter;
   an output high bandwidth inverter;
   an inverter controller adapted to calculate harmonics at the input and output of the frequency changer and control the input and output high bandwidth inverters to generate input and output harmonic cancellation signals;
   an input harmonic injection transformer connected to the input inverter and the input of the frequency changer to inject said input harmonic cancellation signals; and an output harmonic injection transformer connected to the output inverter and the output of the frequency changer to inject said output harmonic cancellation signals.

2. The power converter system of claim 1, wherein the frequency of the output voltage is approximately at or above the frequency of the input voltage.

3. The power converter system of claim 1, wherein the inverter controller calculates harmonics at the input and output of the frequency changer from a control algorithm selected from the group consisting of: fundamental differential harmonic neutralization by series voltage injection; discrete harmonic neutralization by series voltage injection; and discrete harmonic neutralization by current injection.

4. The power converter system of claim 1, wherein said frequency changer is implemented as a three-phase to three-phase matrix converter.

5. The power converter system of claim 1, wherein said high bandwidth inverters have a multilevel cascade H-bridge topology.

6. The power converter system of claim 1, wherein said high bandwidth inverters have a multilevel diode-clamped inverter topology.

7. A power converter system, comprising:
a frequency changer with an input and an output, the frequency changer adapted to accept an input voltage at an input frequency at the input and deliver an output voltage at an output frequency at the output;
an input high bandwidth inverter;
an output high bandwidth inverter;
an inverter controller adapted to calculate harmonics at the input and output of the frequency changer and control the input and output high bandwidth inverters to generate input and output harmonic cancellation signals;
an input harmonic injection transformer connected to the input inverter and the input of the frequency changer to inject said input harmonic cancellation signals; and
an output harmonic injection transformer connected to the output inverter and the output of the frequency changer to inject said output harmonic cancellation signals, wherein said harmonics calculated by the inverter controller are input and output voltage harmonics.

8. The power converter of claim 7, wherein said input harmonic injection transformer is in series with said frequency changer.

9. The power converter system of claim 7, wherein said frequency changer is implemented as an Unrestricted Frequency Changer or a Matrix Converter.

10. The power converter system of claim 7, wherein the inverter controller calculates harmonics at the input and output of the frequency changer from a control algorithm selected from the group consisting of: fundamental differential harmonic neutralization by series voltage injection; and discrete harmonic neutralization by series voltage injection.

11. The power converter system of claim 7, wherein said frequency changer is implemented as a three-phase to three-phase matrix converter.

12. The power converter system of claim 7, wherein said input and output high bandwidth inverters comprise a circuit topology selected from the group consisting of: multilevel cascade H-bridge and multilevel diode-clamped inverter topologies.

13. The power converter system of claim 12, wherein said input and output high bandwidth inverters include switching frequencies in the range of about 40 kHz to about 50 kHz.

14. A power converter system, comprising:
a frequency changer with an input and an output, the frequency changer adapted to accept an input voltage at an input frequency at the input and deliver an output voltage at an output frequency at the output;
an input high bandwidth inverter;
an output high bandwidth inverter;
an inverter controller adapted to calculate harmonics at the input and output of the frequency changer and control the input and output high bandwidth inverters to generate input and output harmonic cancellation signals;
an input harmonic injection transformer connected to the input inverter and the input of the frequency changer to inject said input harmonic cancellation signals; and
an output harmonic injection transformer connected to the output inverter and the output of the frequency changer to inject said output harmonic cancellation signals, wherein said generated input and output harmonic cancellation signals are narrow band discrete harmonic cancellation signals.

15. The power converter system of claim 14, wherein said calculated harmonics are voltage harmonics.

16. The power converter system of claim 14, wherein said calculated harmonics are current harmonics.

17. The power converter system of claim 14, wherein said input harmonic injection transformer is in series with said frequency changer.

18. The power converter system of claim 14, wherein said input harmonic injection transformer is in parallel with said frequency changer.

19. The power converter system of claim 14, wherein said frequency changer is implemented as an Unrestricted Frequency Changer or a Matrix Converter.

20. The power converter system of claim 15, wherein said frequency changer is implemented as a three-phase to three-phase matrix converter.

* * * * *